United States Patent
Appel et al.

(10) Patent No.: US 9,618,350 B2
(45) Date of Patent: Apr. 11, 2017

(54) ANOMALY DETECTION FOR ROAD USER CHARGING SYSTEMS

(71) Applicant: International Business Machines Corporation, Armonk, NY (US)

(72) Inventors: Todd M. Appel, Amstelveen (NL); Duncan A. Ashby, Surbiton (GB); So Yeon Chun, Atlanta, GA (US); Milind R. Naphade, Fishkill, NY (US); Richard J. Nash, Portsmouth (GB); Anshul Sheopuri, White Plains, NY (US); Anders Thornqvist, Sollentuna (SE); Martin Vuyk, Nederhorst den Berg (NL)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/995,380

(22) Filed: Jan. 14, 2016

(65) Prior Publication Data

US 2016/0133061 A1    May 12, 2016

Related U.S. Application Data

(62) Division of application No. 12/752,524, filed on Apr. 1, 2010, now Pat. No. 9,261,375.

(51) Int. Cl.
*G01C 21/34* (2006.01)
*G08G 1/0968* (2006.01)
*G07B 15/06* (2011.01)

(52) U.S. Cl.
CPC ......... *G01C 21/3453* (2013.01); *G07B 15/06* (2013.01); *G07B 15/063* (2013.01); *G08G 1/096827* (2013.01)

(58) Field of Classification Search
CPC .......... G01C 21/3453; G08G 1/096827; G07B 15/06; G07B 15/063
See application file for complete search history.

(56) References Cited

U.S. PATENT DOCUMENTS

| 5,920,382 A | 7/1999 | Shimizu et al. |
| 2002/0072963 A1 | 6/2002 | Jonge |
| 2007/0225912 A1 | 9/2007 | Grush |

(Continued)

*Primary Examiner* — Asfand Sheikh
(74) *Attorney, Agent, or Firm* — Harrington & Smith; Louis J. Percello

(57) ABSTRACT

A computer readable medium embodies a program of machine-readable instructions executable by a processing apparatus to perform operations including determining information corresponding to a number of differences in distances between ending points of journeys taken by a vehicle and starting points of consecutive journeys taken by the vehicle, and transmitting one or more representations of the information. Another computer readable medium tangibly includes instructions for, for each of a number of vehicles, receiving one or more scores corresponding to a vehicle, and determining a ranked list containing at least a portion of the scores, and outputting the ranked list. Another computer readable medium includes instructions for, for each of a number of vehicles, receiving information corresponding to a vehicle, using one or more metrics, calculating one or more values from the received information, and communicating one or more representations of the one or more value to one or more entities.

18 Claims, 11 Drawing Sheets

(56) References Cited

U.S. PATENT DOCUMENTS

| | | |
|---|---|---|
| 2007/0278300 A1 | 12/2007 | Dawson et al. |
| 2009/0043593 A1 | 2/2009 | Herbrich et al. |
| 2009/0234523 A1 | 9/2009 | Nandedkar et al. |
| 2010/0070349 A1* | 3/2010 | Daems .................. G01S 5/0027 705/13 |
| 2010/0076878 A1* | 3/2010 | Burr ....................... G06Q 30/04 705/34 |
| 2010/0153125 A1 | 6/2010 | Hamilton et al. |
| 2010/0287038 A1* | 11/2010 | Copejans ............. G07B 15/063 705/13 |
| 2011/0153267 A1* | 6/2011 | Peeters .................. G07B 15/06 702/150 |
| 2012/0150425 A1 | 6/2012 | Chapman et al. |
| 2015/0088618 A1* | 3/2015 | Basir .................... G07B 15/063 705/13 |

* cited by examiner

ANOMALY DETECTION FOR ROAD USER CHARGING SYSTEMS

CROSS-REFERENCE TO RELATED APPLICATIONS

This application is a divisional of U.S. patent application Ser. No. 12/752,524, filed Apr. 1, 2010.

BACKGROUND

This invention relates generally to systems that communicate with units in vehicles for road user charging purposes and, more specifically, relates to anomaly detection for road user charging systems.

In road user charging systems, an on-board unit (OBU) is placed in each vehicle to be charged. The charging is based on, e.g., distance traveled, zone, time of travel, and the like. For instance, a goal for this type of system may be to managing traffic congestion by setting higher costs for travel on certain roads or in certain areas. Thus, roads or areas that are typically congested have a higher cost for travel. These systems also may include variable pricing based on travel during certain times of the day. That is, it is more expensive to travel during peak hours. These systems also provide taxes for use of the roads.

In many of these systems, the OBU keeps track of locations, times at those locations, and the like. At certain times, the OBU reports this data to a central location, called the "back office." The back office then bills the user based, e.g., on a road use schedule.

Because these systems are becoming more widespread, abusers of the systems are also becoming more prevalent. For example, software is available to fake user location: information can be stored in the OBU indicating that the vehicle is located in a low cost zone, when actually the vehicle is located in a high cost zone. Additionally, the OBU may also be tampered with, switched off, or put into different vehicles.

Gantries typically serve as enforcement mechanisms. For example, a gantry observes a vehicle being in a high price zone but the vehicle claims to be in a low price zone at the observation time. As another example, a gantry uses automatic number plate recognition (ANPR) to determine that a license plate number viewed on a vehicle is different from a license place associated with the OBU for the vehicle.

While these techniques work for certain situations, gantries are an additional cost and a vehicle might travel paths with infrequent pathways through gantries. Further, a savvy abuser could determine where the gantries are and correct the data in an OBU prior to passing through a gantry, but then create incorrect data for those times when travel is not near a gantry. In these situations, gantries may have limited effect as enforcement mechanisms.

What is needed, therefore, are techniques for improving enforcement.

SUMMARY

In an exemplary embodiment, a computer readable medium is disclosed that tangibly embodies a program of machine-readable instructions executable by a digital processing apparatus to cause the digital processing apparatus to perform operations including, for each of a number of vehicles, receiving information corresponding to a vehicle. The operations also include, using one or more metrics, calculating one or more values from the received information, and communicating one or more representations of the one or more values to one or more entities.

In another exemplary embodiment, a computer readable medium is disclosed that tangibly embodies a program of machine-readable instructions executable by a digital processing apparatus to cause the digital processing apparatus to perform operations including, for each of a number of vehicles, receiving one or more scores corresponding to a vehicle. The operations also include determining a ranked list containing at least a portion of the scores, and outputting the ranked list.

In yet another exemplary embodiment, a computer readable medium is disclosed that tangibly embodies a program of machine-readable instructions executable by a digital processing apparatus to cause the digital processing apparatus to perform operations including determining information corresponding to a number of differences in distances between ending points of journeys taken by a vehicle and starting points of consecutive journeys taken by the vehicle. The operations also include transmitting one or more representations of the information.

In a further exemplary embodiment, an apparatus is disclosed that includes one or more memories including instructions, and one or more processors operatively coupled to the one or more memories, the one or more processors configured by the instructions to cause the apparatus to perform operations including determining information corresponding to a number of differences in distances between ending points of journeys taken by a vehicle and starting points of consecutive journeys taken by the vehicle. The operations also include transmitting one or more representations of the information.

BRIEF DESCRIPTION OF THE SEVERAL VIEWS OF THE DRAWINGS

The foregoing and other aspects of embodiments of this invention are made more evident in the following Detailed Description of Exemplary Embodiments, when read in conjunction with the attached Drawing Figures, wherein.

DETAILED DESCRIPTION

Figure 1:
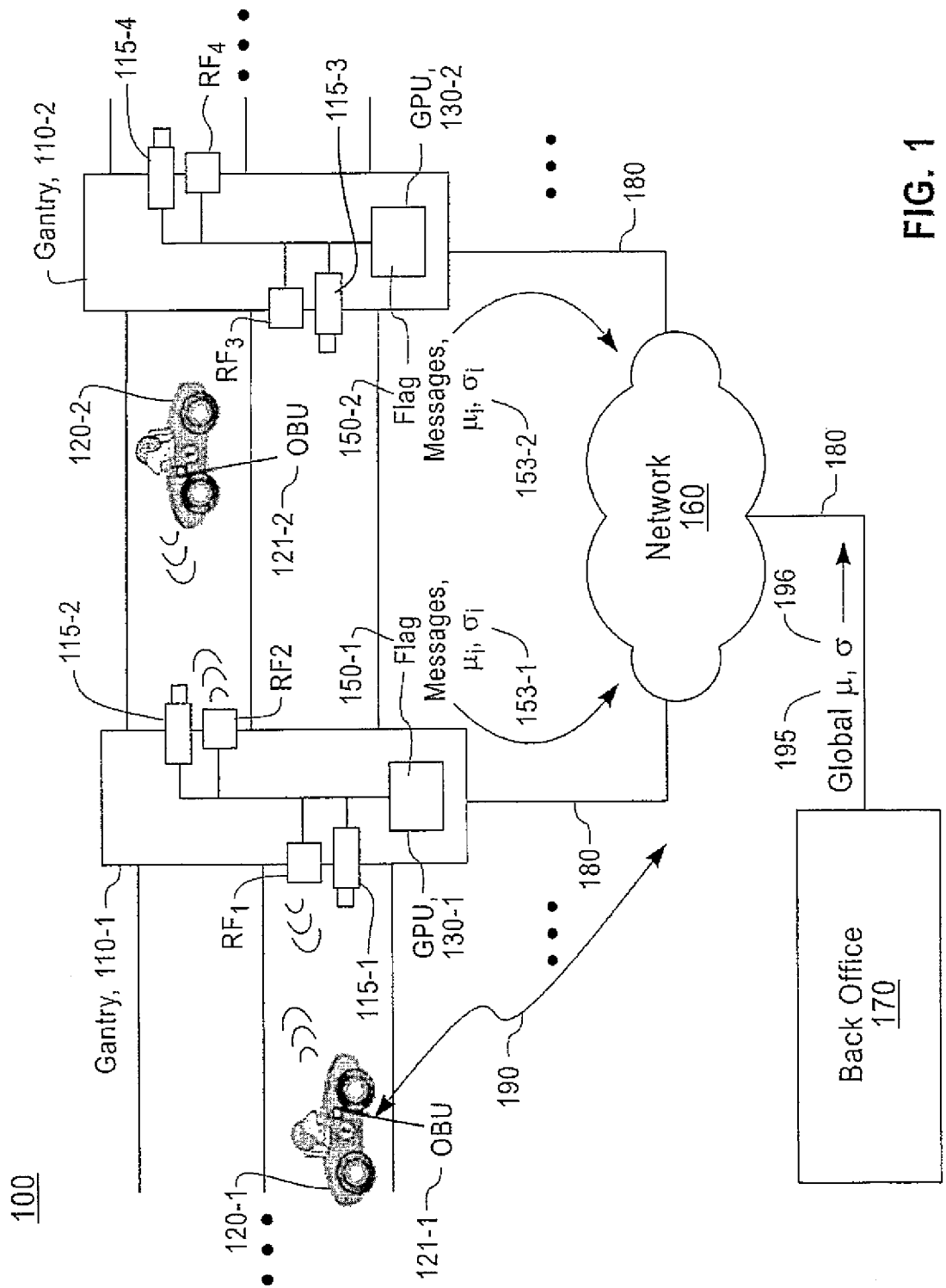
FIG. 1 is a block diagram of an exemplary road user charging system suitable for use with the invention.

Before proceeding with a description of exemplary embodiments of the invention, a more detailed discussion of problems with current road user charging systems is presented. As described above, there are certain situations where fraud might be performed on an OBU and a gantry might not detect the fraud. In particular, if an on-board unit (OBU) is set so that correct data is used near known gantries but incorrect data is used when not near gantries, a gantry typically cannot serve as an enforcement mechanism or has a much reduced capacity as an enforcement mechanism. For the situations where an OBU is loaded with incorrect data at some time, the OBU should be loaded again with correct data at some future time. There should therefore be a difference between the last known position, which is the ending point of the previous journey, and the position when the OBU is enabled again, which is a beginning point for a consecutive journey. Thus, one would believe that it would be a simple matter to test for fraud by having an OBU test for any difference in position between the ending point for a previous journey and a beginning point of a consecutive, new journey. For instance, the OBU may be simply switched off to prevent charging.

However, there is some amount of natural variability in determination of the beginning point of a consecutive journey. For example, it is generally the case that an OBU powers down (e.g., is placed into a low power state) when a vehicle is turned off. This conserves the battery power of the vehicle. When the vehicle is turned back on, the OBU then powers on and begins recording data. There is typically a delay between power on time and when the OBU can synchronize with a global positioning system (GPS) or other positioning system in order to determine a current position. In some instances, this delay could be substantial if in a mountainous, covered, or urban area. Thus, even for normal OBUs, there will be some variability in a distance between the end point (e.g., position) of a previous journey and a beginning point (e.g., position) of a consecutive, new journey.

Certain exemplary embodiments of the invention take this variability into account by collecting data about the distances between end points of previous journeys and beginning points of consecutive journeys from multiple OBUs in multiple vehicles. The OBUs collect data about their own distances and communicate this data to a central location. This data is used to determine information about what amounts to a distance difference distribution of the distances from the population of multiple OBUs. This information, such as a mean and a standard deviation, corresponding to the probability distribution is communicated to OBUs in the vehicles. It is noted that typically an actual population probability distribution is not actually determined, but the mean and standard deviation allows one to reconstruct such a distribution. The OBUs use this information to determine if their calculated distances are potentially fraudulent. Different exemplary metrics are used to determine potential fraud on a single journey or to determine potential fraud on multiple journeys. The OBUs, in an exemplary embodiment, report information about potential fraudulent activity, generally through scores determined using the metrics, to a central location. The central location accumulates the data from multiple OBUs and then ranks the data from highest to lowest probability of fraudulence.

Turning now to FIG. 1, this figure shows a block diagram of an exemplary road user charging system 100 suitable for use with the invention. The road user charging system 100 includes N gantries, of which only gantries 110-1 and 110-2 are shown. The gantries 110 are connected to the back office 170 through a radio frequency (RF) or wired network 160 and wireless or wired network links 180. Gantry 110-1 includes (in this example) two cameras 115-1 and 115-2, two radio frequency communication systems (RF1 and RF2) and a gantry processing unit (GPU) 130-1. Similarly, gantry 110-2 includes (in this example) two cameras 115-3 and 115-4, two radio frequency communication systems (RF3 and RF4) and a GPU 130-2. The gantry 110-1 is shown in RF communications with vehicles 120-1 and 120-2.

Each vehicle 120-1, 120-2 has an OBU 121-1, 121-2, respectively. Each OBU meeting certain criteria (described below) sends flag messages to the gantries 110. In this example, there are several flag messages 150-1 communicated from OBUs 121 through gantry 110-1, through network 160, and to the back office 170. There are additionally several flag messages 150-2 communicated from OBUs 121 through gantry 110-2, through network 160, and to the back office 170. The OBUs 121 also communicate data about the distances they determine between ending points of previous journeys and beginning points of consecutive, new journeys to the back office 170, through gantries 110. In this example, certain OBUs 121 determine a distance difference distribution and from the distance difference distribution (not shown in this figure) determine a mean, $\mu_i$, and a standard deviation, $\sigma_i$, and send a representation 153-1 of the mean, $\mu_i$, and a standard deviation, $\sigma_i$, to the back office 170. Similarly, certain other (or potentially the same) OBUs 121 determine a distance difference distribution and from the distance difference distribution determine a mean, $\mu_i$, and a standard deviation, $\sigma_i$, and send a representation 153-2 of the mean, $\mu_i$, and a standard deviation, $\sigma_i$, to the back office 170.

The back office 170 uses the means and standard deviations to calculate a global mean, $\mu$, 195 and a global standard deviation, $\sigma$, 196. The back office 170 then communicates the global mean 195 and global standard deviation 196 to the OBUs 121 via the network 160 and gantries 110.

It should be noted that the OBUs 121 may be able to bypass the gantries 110 and communicate with the network 160 via a wired or wireless network link 190. However, for simplicity, it is assumed herein that the OBUs 121 communicate only through gantries 110, although this is not a requirement and other techniques may be used.

Figure 2:
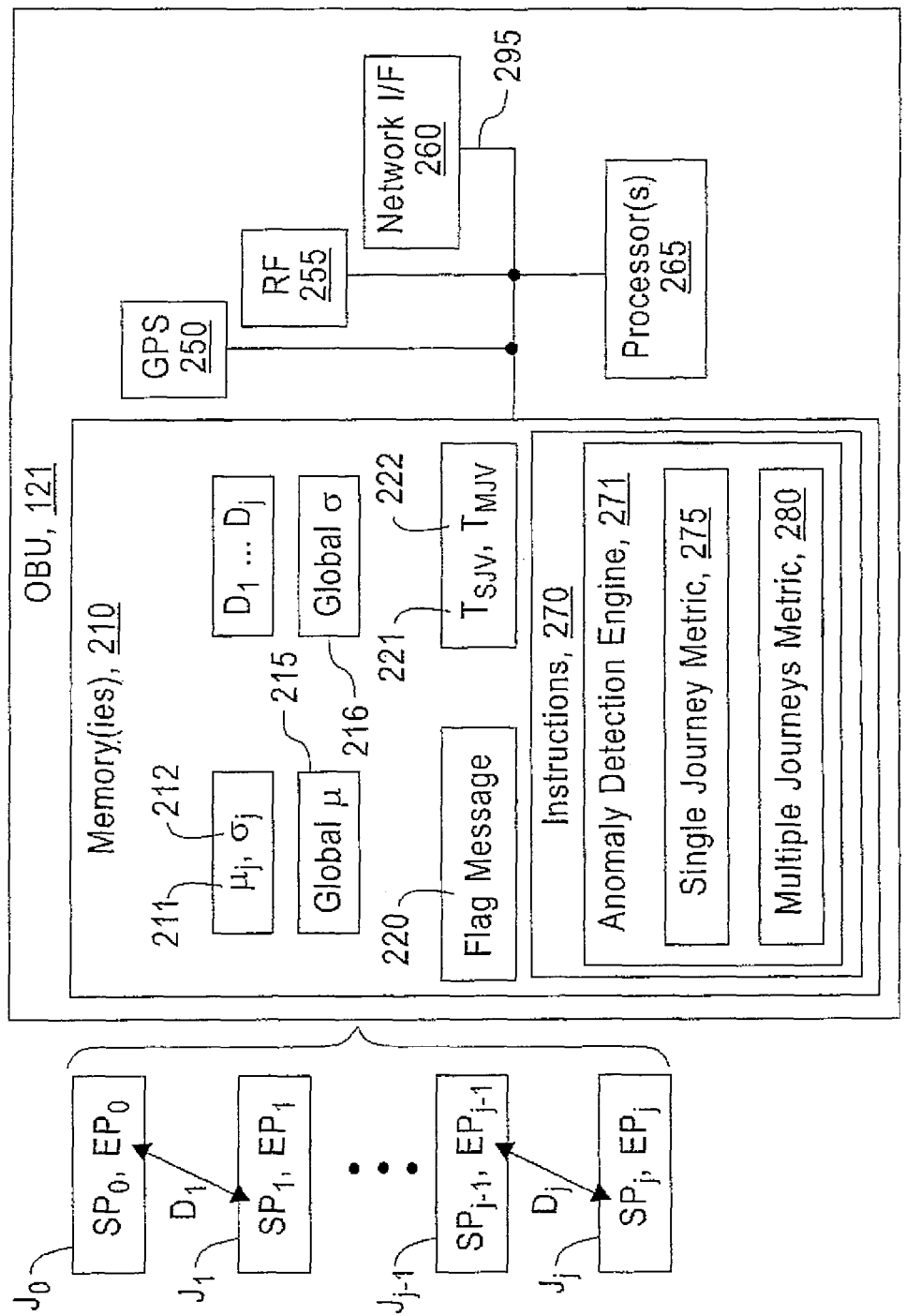
FIG. 2 is a block diagram illustrating an exemplary on-board unit operating in accordance with an exemplary embodiment of the invention.

Turning now to FIG. 2, a block diagram is shown illustrating an exemplary on-board unit (e.g., a digital processing apparatus) operating in accordance with an exemplary embodiment of the invention. The OBU 121 comprises one or more memories 210 coupled through one or more buses 295 to a GPS 250, an RF transceiver 255, a network interface 260, and one or more processors 265. The one or more memories 210 include instructions 270, which when executed by the one or more processors 265 cause the OBU 121 to perform specific actions. The instructions 270 include an anomaly detection engine 271, which contains the instructions that cause the OBU 121 to perform the actions described herein. The anomaly detection engine 271 includes a single journey metric 275 (see FIG. 6 also) and a multiple journeys metric 280 (see FIG. 8 also).

The one or more memories 210 include a mean, $\mu_j$, 211, a standard deviation, $\sigma_j$, 212, distances $D_1$ through $D_j$, a global mean, $\mu$, 215, a global standard deviation, $\sigma$, 216, a flag message 220, a single journey value threshold, $T_{SJV}$, 221, and a multiple journeys threshold, $T_{MJV}$, 222. Also shown are journeys $J_0$ through $J_j$, each of which has a starting point, SP, and an ending point, EP. The distances $D_1$ through $D_j$ are shown being calculated from the corresponding ending point, EP, and starting point, SP. For instance, distance $D_1$ is calculated by subtracting the ending point $EP_0$ of a previous journey $J_0$ from the starting point $SP_1$ of a consecutive journey $J_1$. Distance $D_j$ is calculated by subtracting the ending point $EP_{j-1}$ of a previous journey $J_{j-1}$ from the starting point $SP_j$ of a consecutive journey $J_j$. In terms of subscripts, the subscript j is the current journey, and the journeys start at zero to make the subscripts easier to describe. The subscript i is used to indication one of n OBUs 121.

With regard to the thresholds 221, 222, these are used in certain embodiments and not used in others. For instance, each OBU 121 could use the single journey metric 275 and/or the multiple journeys metric 280 to determine a score for each metric. The score(s) would then be sent from the OBUs 121 to the back office 170, without regard to the value(s) for the score(s). Alternatively, OBUs 121 might send only those scores that surpass the thresholds 221, 222 to the back office 170.

Figure 7:
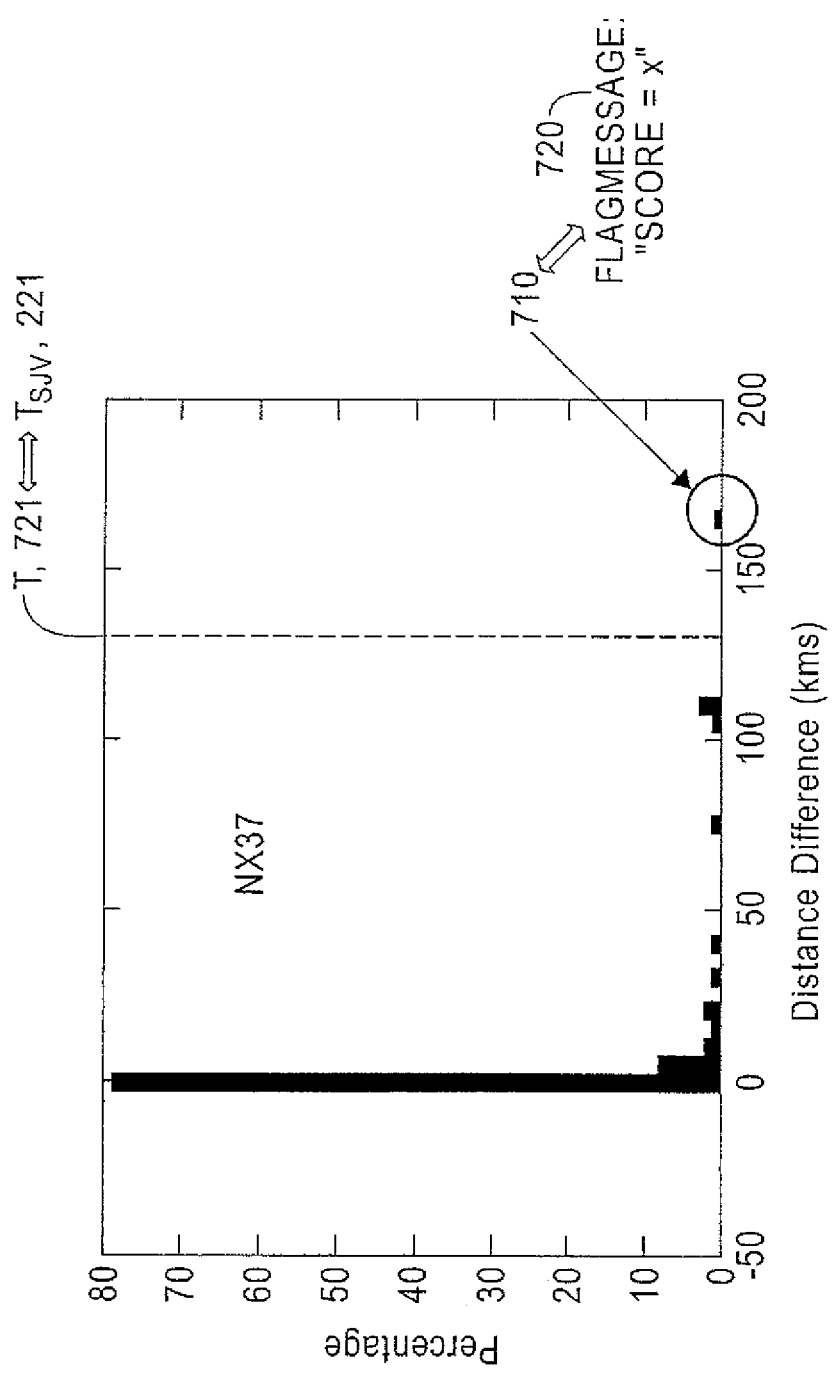
FIG. 7 is a graph of an example of a distance difference distribution of distance values and an outlier value indicating possible fraud.
Figure 9:
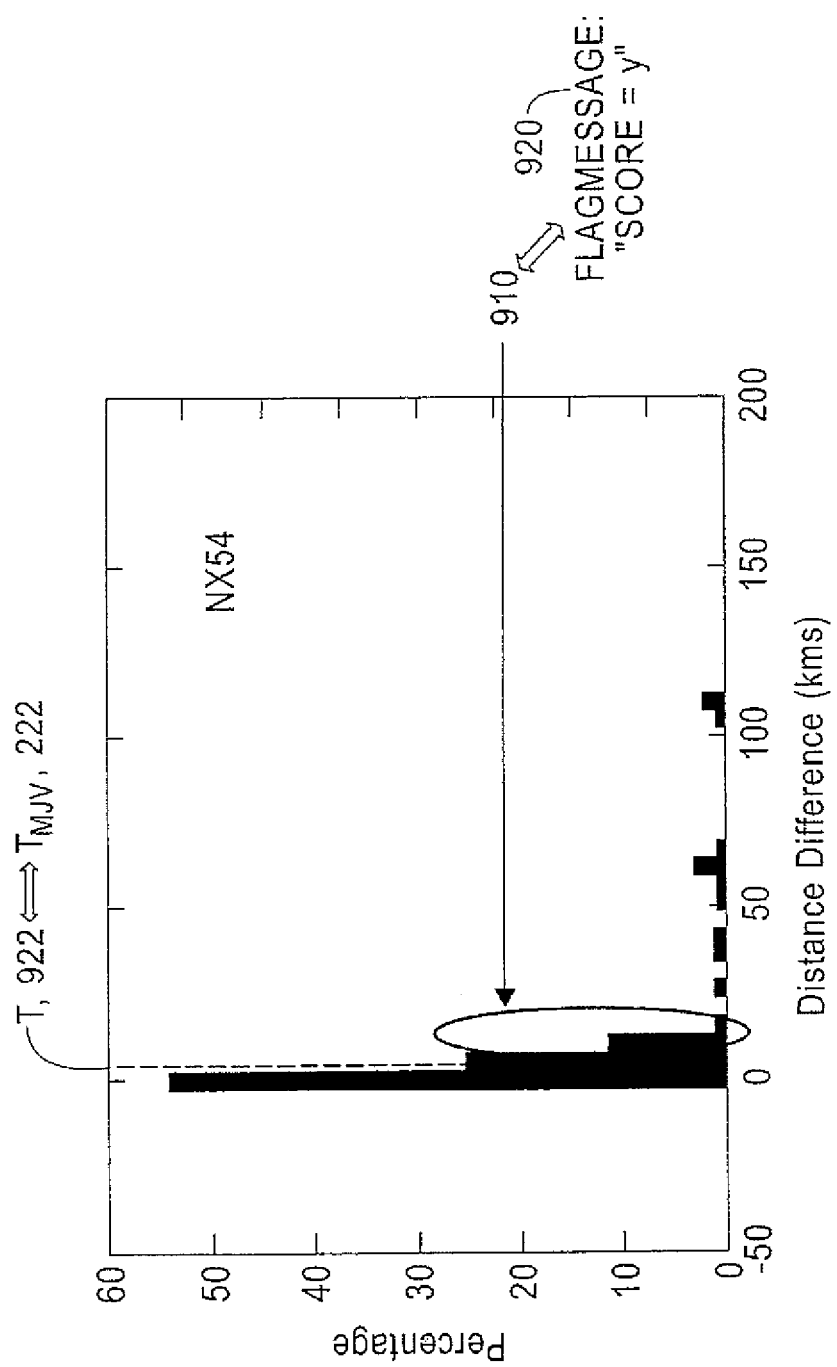
FIG. 9 is a graph of an example of a distance difference distribution of distance values and a set of outlier values indicating possible fraud.

It should be noted that typically only the ending point ($EP_{j-1}$) of the previous journey ($J_{j-1}$) and the starting point ($SP_j$) of the current journey ($J_j$) are kept in the one or more memories 210, until the current journey ends, when the current ending point ($EP_j$) replaces the previous ending point. Additionally, the distances $D_1$ through $D_j$ may be assembled into distance difference distributions, as shown in FIGS. 7 and 9 below. Further, the operation of the OBU 121 is described in further detail below.

Figure 3:
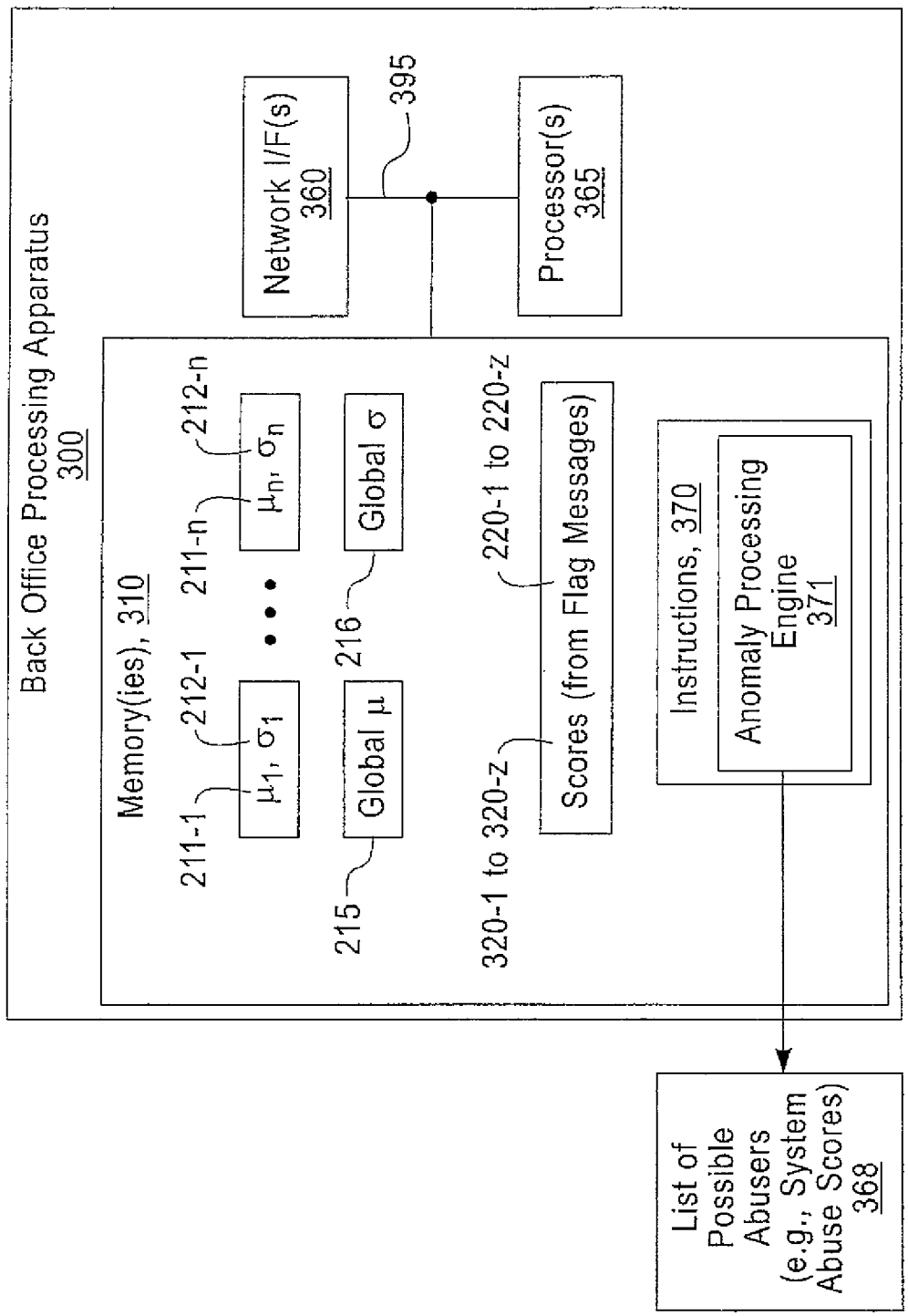
FIG. 3 is a block diagram of an exemplary back office processing apparatus operating in accordance with an exemplary embodiment of the invention.

The OBUs 121 use the metrics 275, 280 to determine scores (not shown in FIG. 2 but shown in other figures, e.g., like FIG. 3), which are then communicated to a central server, such as that shown in FIG. 3. The scores may be compared to the thresholds 221, 222, and only those scores sent by the OBU 121 if the scores exceed the thresholds 221, 221. Alternatively, each score could be sent by the OBU 121. Furthermore, the highest score determined between the metrics 272, 280 may be sent, or both scores may be sent. Although not shown, the back office processing apparatus 300 could have one or more radio frequency transceivers.

Referring now to FIG. 3, a block diagram is shown of an exemplary back office processing apparatus 300 (e.g., in back office 170) operating in accordance with an exemplary embodiment of the invention. The apparatus 300 may be considered to be a digital processing apparatus. The back office processing apparatus 300 is an example of a central server. The back office processing apparatus 300 includes one or more memories 310 coupled to one or more network interfaces 360 and one or more processors 365 through one or more buses 395. The one or more memories 310 include n means 211 (i.e., $\mu_1$, 211-1 through $\mu_n$, 211-n) from n OBUs 121, n standard deviations (i.e., $\sigma_1$, 212-1 through $\sigma_n$, 212-n), a global mean $\mu$, 215, a global standard deviation, $\sigma$, 216, and z scores 320-1 through 320-z from flag messages 220-1 through 220-z (in this example, one score per flag message 220, although this is not a requirement and there may be more than one score per flag message). The one or more memories 310 also include instructions 370, which when executed by the one or more processors 365 cause the back office processing apparatus 300 to perform specific actions. The instructions 370 include an anomaly processing engine 371, which contains the instructions that cause the back office processing apparatus 300 to perform the actions described herein.

As is described in more detail below, the anomaly processing engine 371 determines the global mean 215 and global standard deviation 216 from the means 211 and standard deviations 212, respectively. The anomaly processing engine 317 cause the global mean 215 and global standard deviation 216 to be communicated, using the one or more network interfaces 360, to the OBUs 121. Certain of the OBUs 121, in this example in OBUs 121, send flag messages 220-1 through 220-m to the back office processing apparatus 300. The anomaly processing engine 371 then creates a list 368 of possible abusers using the scores 320 from the flag messages 220. The list 368 in one example is a set of system abuse scores, typically ranked from most probable abuser to least probable abuser, as described below. The system abuse scores are the scores 320. The scores 320 are communicated to the apparatus 300 from the OBUs 121. There may be z scores 320, z less than n, where n is the number of OBUs 121, if thresholds 221, 222 are used. Alternatively, z may be equal to n, if each OBU 121 reports scores 320 without using thresholds 221, 221. Additionally, there could be two scores 320 per OBU 121, one score for each metric 275, 280, if desired.

Figure 4:
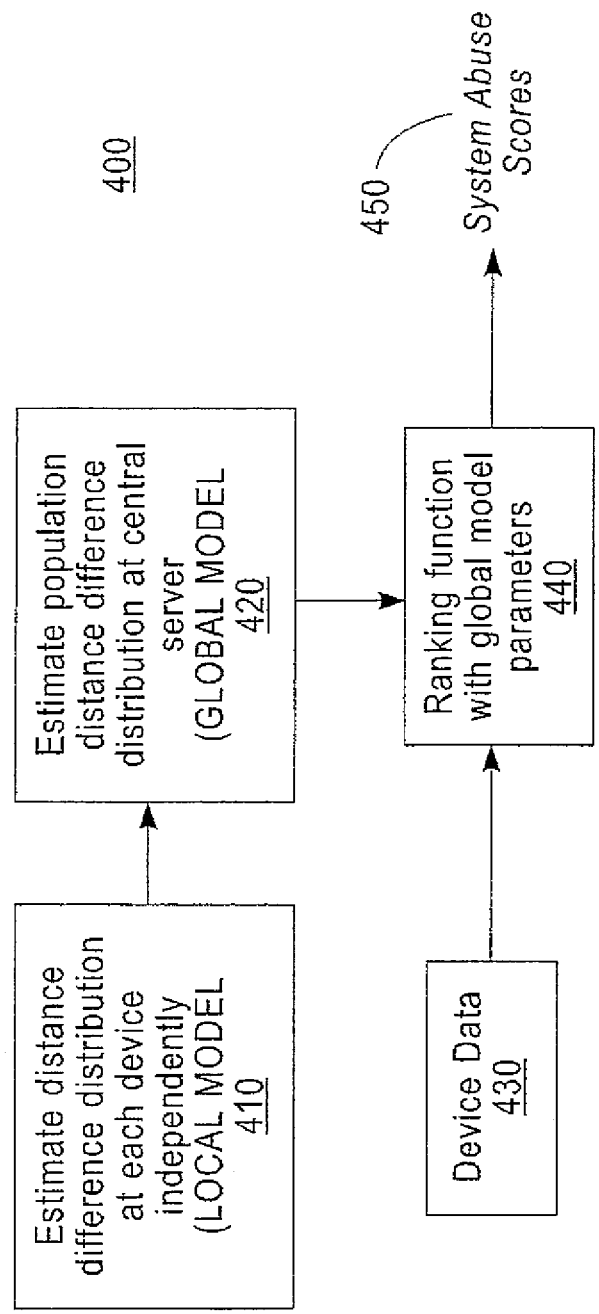
FIG. 4 is a block diagram of a heuristic overview of an exemplary embodiment of the invention.

Referring now to FIG. 4, a block diagram is shown of a heuristic overview 400 of an exemplary embodiment of the invention. The heuristic overview 400 includes a local model in block 410, a global model in block 420, device data 430 in block 430, a ranking function in block 440, and system abuse scores 450. In general, the heuristic overview 400 includes estimating a local model (block 410) and computing system abuse scores 450 by benchmarking against a global model (computed in block 420 and implemented in a ranking function in block 440). Thus, in block 410, each device (e.g., OBU 121) independently estimates a distance difference distribution for the distance differences between an ending point of a previous journey and a starting point of a consecutive journey. A population distance difference distribution is estimated at a central server (e.g., the back office 170 and its processing apparatus 300). In block 440, each OBU 121 uses device data (from block 430) to apply a ranking function that uses global model parameters to produce system abuse scores 450. Exemplary ranking functions include the single journey metric 275 (shown, e.g., in FIG. 6) and/or the multiple journeys metric 280 (shown, e.g., in FIG. 8). System abuse scores 450 meeting a threshold (e.g., the single journey value threshold, $T_{SJV}$, 221, and/or the multiple journeys threshold, $T_{MJV}$, 222) are communicated by an OBU 121 to the central server via a flag message 150 (in FIG. 1) or 220 (in FIG. 2 or 3). Alternatively, all system abuse scores 450 determined by an OBU 121 are sent to the central server. The system abuse scores 450 would also include unique identifiers (discussed below) in order to link a system abuse score 450 with an OBU 121, and this set of data is an example of a list 368 (see FIG. 3) of possible abusers.

Figure 5:
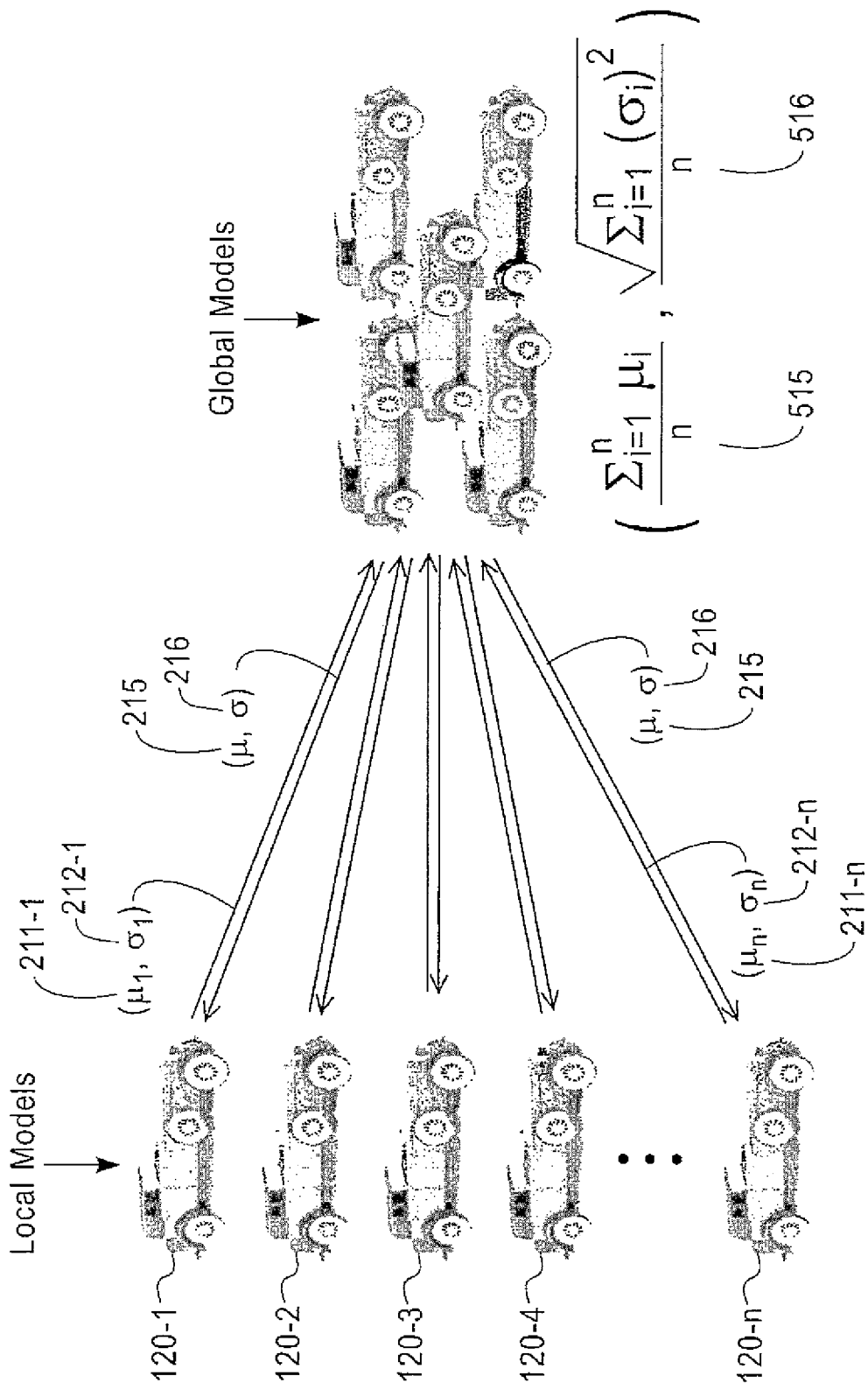
FIG. 5 is a diagram illustrating exemplary information flows in an exemplary embodiment of the invention.

Turning now to FIG. 5, a diagram is shown illustrating exemplary information flows in a exemplary embodiment of the invention. In this example, the local model for each OBU 121 (not shown in FIG. 5) in each vehicle 120-1 through 120-n determines a mean, $\mu_i$, 211, a standard deviation, $\sigma_i$, 212 that are communicated from the OBU 121 to a central server (e.g., processing apparatus 300 of FIG. 3). The global model then uses metric 515, $$\frac{\sum_{i=1}^{n} \mu_i}{n},$$

to determine the global mean 215, and uses metric 516, $$\frac{\sqrt{\sum_{i=1}^{n} (\sigma_i)^2}}{n},$$

to determine the global standard deviation 216. The global mean 215 and global standard deviation 216 are sent back to each of the OBUs 121 in the vehicles 120.

It is noted that the design shown, e.g., in FIG. 5 facilitates privacy-preserving information transfer to enable estimation of model parameters for anomaly detection. Additionally, asymptotic convergence of a sum of independent random variables to a Gaussian distribution is guaranteed by the extended CLT (central limit theorem) under the Lyapunov condition. It is also noted that the design shown in FIG. 5 has an additional messaging cost of only four floating point numbers (approximately 16 bytes) per car, plus some cost for the flag messages.

Figure 6:
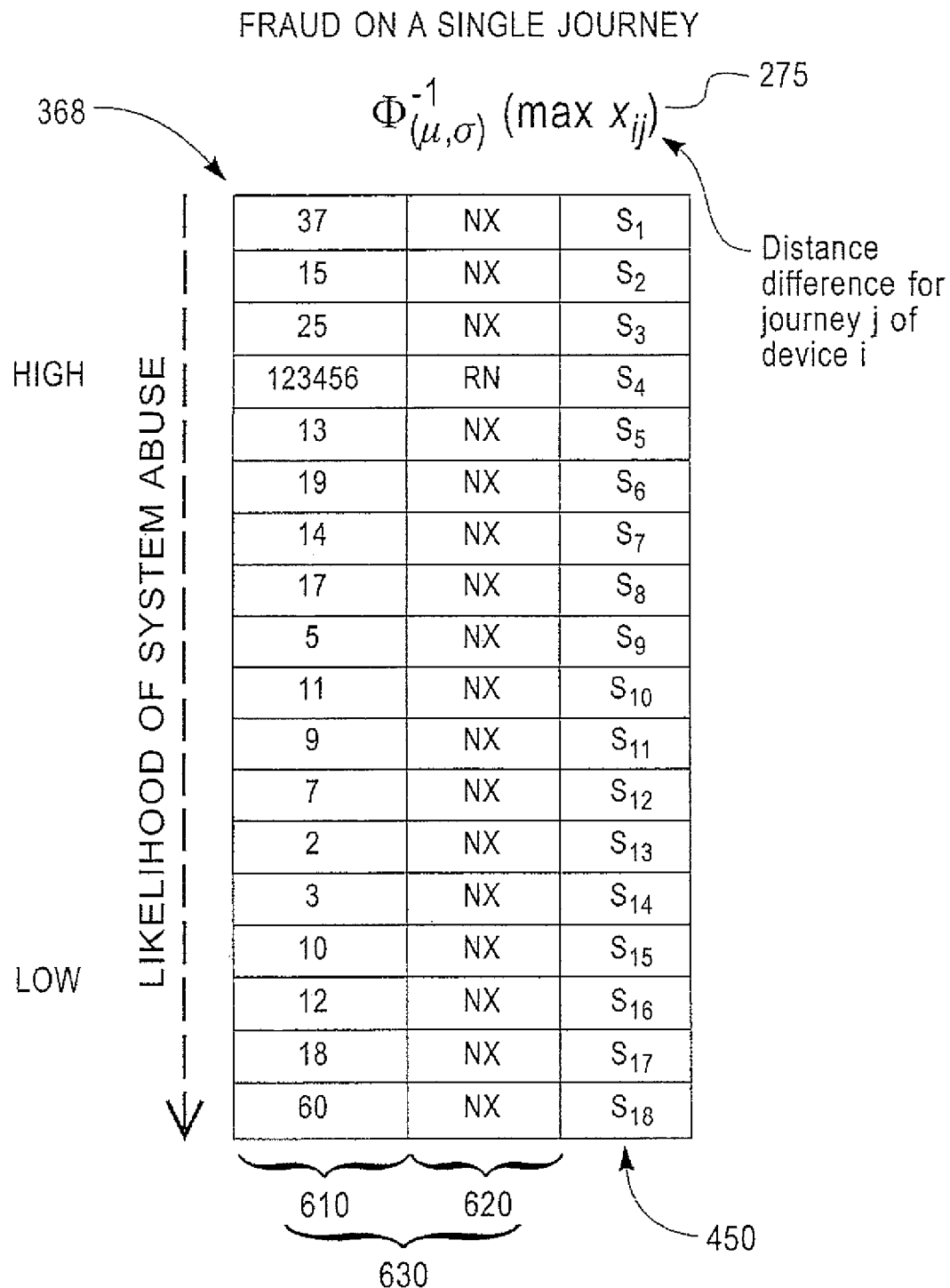
FIG. 6 is an example of a single journey metric used to determine possible fraud involving a single journey, and a ranked list of system abuse scores and their associated unique identifiers.

FIG. 6 is an example of a single journey metric 275 used to determine possible fraud involving a single journey, and a ranked list 368 of system abuse scores 450 and their associated unique identifiers 630. In this example, the unique identifiers 630 are determined using a numeric identifier 610 and an alphabetic identifier 620. However, these are examples and any identification can be used that uniquely identifies the OBU 121 (and therefore an associated user). The single journey metric 275 is the following: $\Phi_{(\mu,\sigma)}^{-1}(\max x_{ij})$, where $\Phi_{(\mu,\sigma)}^{-1}(\bullet)$ is an inverse normal cumulative distribution function (cdf), max is a maximum function, the mean, $\mu$, is the a global mean 215, and the standard deviation, $\sigma$, is the global standard deviation 216. As shown, this metric 275 is for all of the OBUs 121, although a single OBU 121 uses the same metric 275, over max $x_j$. The $x_{ji}$ is a distance difference for journey j of device i.

The system abuse scores 450 are, in this example, ranked in terms of probability, that is, likelihood of system abuse, with values of scores arranged as follows: $S_1 > S_2 > \ldots > S_{18}$. It is noted that each OBU 121 calculates the single journey metric 275 to determine a system abuse score 450 and can report each system abuse score 450 (or report scores based on some periodicity) or can report those scores 450 above a threshold.

Referring now to FIG. 7, a graph is shown of an example of a distance difference distribution of distance values and an outlier value 710 indicating possible fraud in a single journey. The distance difference distribution shown is from a single OBU 121 with the unique identifier 630 of NX37. The graph shows the percentage of distances between ending points of previous journeys and starting points of consecutive journeys and the kilometers (kms) of the distances. In theory, the vast majority of these distances should be small, although there will be some normal variability. The outlier value 710 is beyond a threshold 721, which corresponds to the single journey value threshold, $T_{SJV}$, 221. The threshold 221 is in the same "score" domain as the output of the metric 275, but an equivalent threshold 721 in the kilometer domain may also be calculated and is shown here for ease of reference. The OBU 121 that creates such a distance difference distribution will report the score calculated using the metric 275 to a central server (e.g., back office processing apparatus 300), e.g., such as through the exemplary flag message 720, representing the information "score=X" or "single journey metric score=X". The score may also be transmitted only if greater than the single journey value threshold, $T_{SJV}$, 221.

Figure 8:
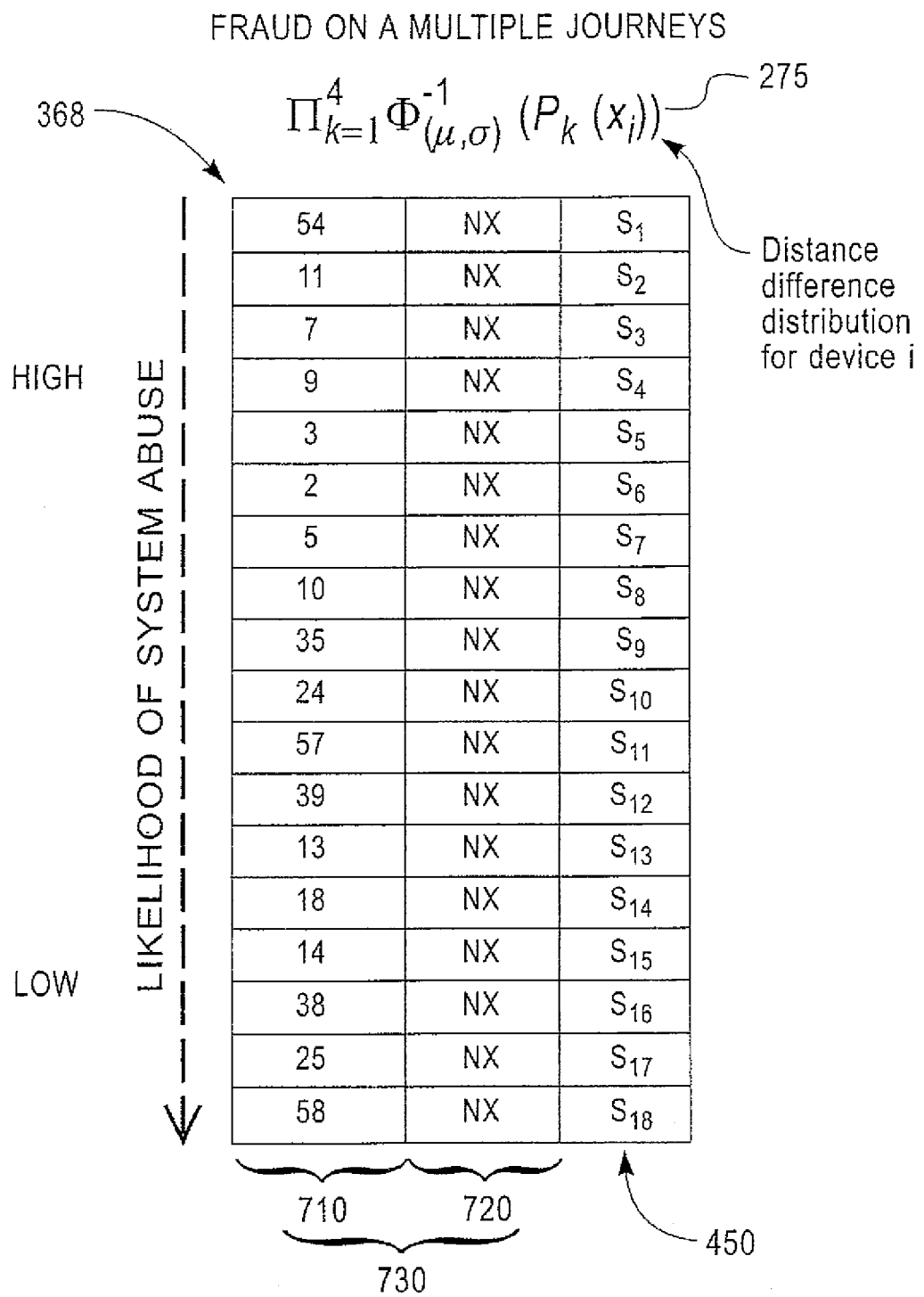
FIG. 8 is an example of a multiple journeys metric used to determine possible fraud involving multiple journeys, and a ranked list of system abuse scores and their associated unique identifiers.

FIG. 8 is an example of a multiple journey metric 280 used to determine possible fraud involving multiple journeys, and a ranked list 368 of system abuse scores 450 and their associated unique identifiers 730. In this example, the unique identifiers 730 are determined using a numeric identifier 710 and an alphabetic identifier 720. However, these are examples and any identification can be used that uniquely identifies the OBU 121 (and therefore an associated user). The multiple journeys metric 280 is the following: $\Pi_{k=1}^{4} \Phi_{(\mu,\sigma)}^{-1}(P_k(X_i))$, where $\Pi_{k=1}^{4}(\bullet)$ is a product function. There are 5 journeys, so four distance differences. The 4 (four) can therefore be a K, a number of distance differences (that is, the number of $x_j$) for device i. The system abuse scores 450 are, in this example, ranked in terms of probability, that is, likelihood of system abuse, with values of scores arranged as follows: $S_1 > S_2 > \ldots > S_{18}$. The $X_i$ is a distance difference distribution for journey j of device i. It is noted that each OBU 121 calculates the multiple journeys metric 280 to determine a system abuse score 450 and reports those scores above a threshold or reports all scores (e.g., based on some periodicity).

FIG. 9 is a graph of an example of a distance difference distribution of distance values and a set of outlier values indicating possible fraud. The distance difference distribution shown is from a single OBU 121 with the unique identifier 730 of NX54. The graph shows the percentage of distances between ending points of previous journeys and starting points of consecutive journeys and the kilometers (kms) of the distances. As described above, the vast majority of these distances should be small, although there will be some normal variability. The outlier values 910 (including the 25 percent at about 5 kms and the 10 percent at about 10 kms) are beyond the threshold 922, which is related to and can be determined from the multiple journeys threshold, $T_{MJV}$, 222. If the threshold 222 is being used, the OBU 121 that creates such a distance difference distribution will report this anomaly to a central server (e.g., back office processing apparatus 300). Such reporting includes in this example an exemplary flag message 920, representing the information "Score=Y" or "multiple journeys metric score=Y". As another example, the OBU 121 can send any score determined from the multiple journey metric 280 (e.g., on a periodic basis).

Figure 10:
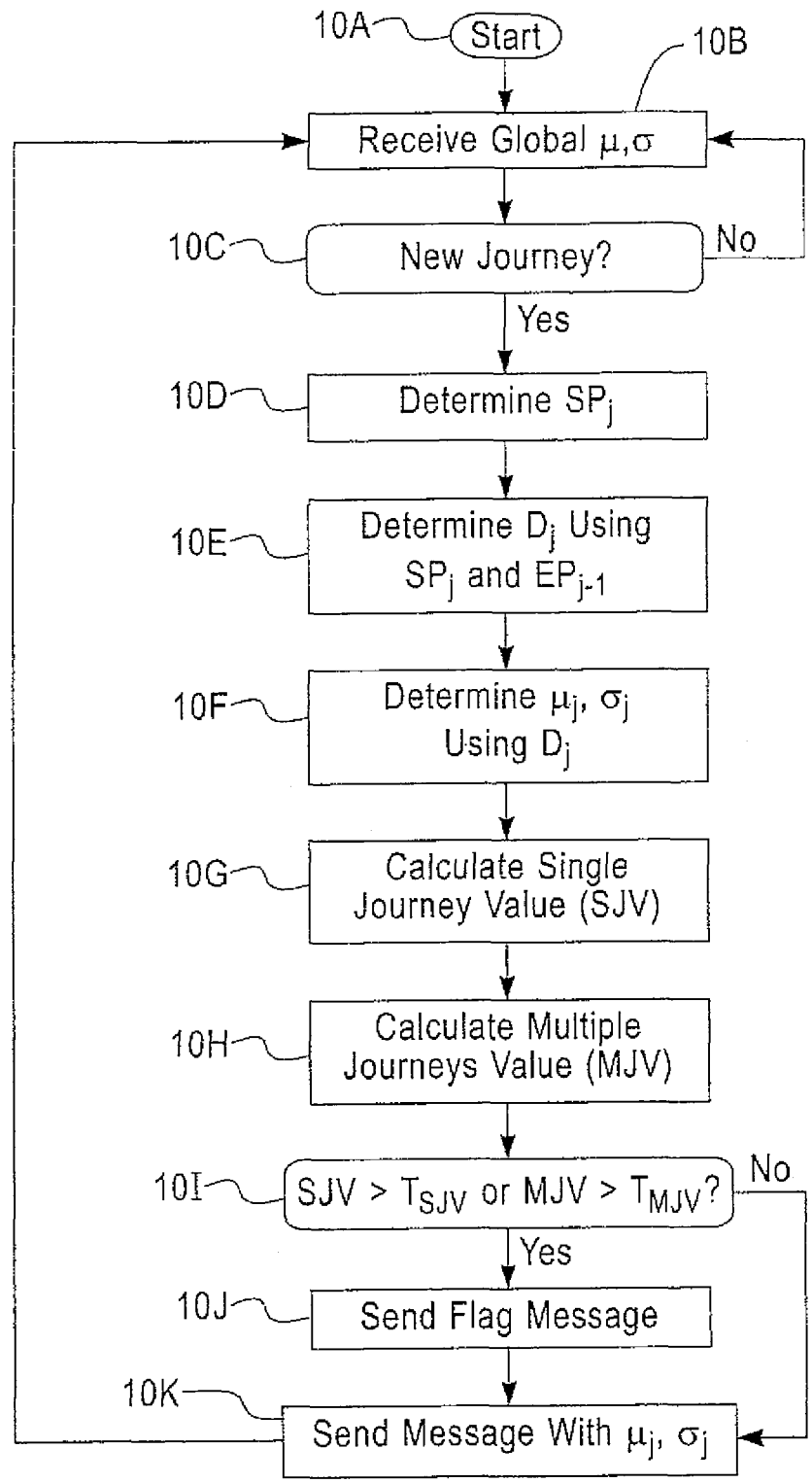
FIG. 10 is a block diagram of actions performed by an OBU in accordance with an exemplary embodiment of the invention.

Turning now to FIG. 10, a block diagram is shown of actions performed by an OBU 121 (e.g., as programmed by the instructions in the anomaly detection engine 271) or other digital processing apparatus in accordance with an exemplary embodiment of the invention. The method begins in block 10A, and in block 10B, the OBU 121 receives the global mean 215 and global standard deviation 216. In block 10C, it is determined if there is a new journey. If not (block 10C=NO), the method continues in block 10B. If there is a new journey (block 10C=YES), the OBU determines a new starting point for the current journey, $SP_j$, in block 10D. In block 10E, the OBU determines a distance, $D_j$, using the current starting point, $SP_j$, and the ending point, $EP_{j-1}$, of the previous journey.

In block 10F, the OBU determines a new mean 211 and a new standard deviation 212 using the current distance, $D_j$, and previous distances, $D_{j-1}$ through $D_1$. In block 10G, a single journey value (SJV) (e.g., a score) is calculated using the single journey metric 275. In block 10H, a multiple journeys value (MJV) (e.g., a score) is calculated using the multiple journeys metric 280. If the SJV is greater than the single journey value threshold, $T_{SJV}$, 221 or the MJV is greater than the multiple journeys threshold, $T_{MJV}$, 222 (block 10I=YES), then a flag message is sent in block 10J. The flag message could include one or both scores of the SJV or MJV. If not (block 10I=NO) a message is sent with the mean 211 and standard deviation 212 in block 10K. Note that the mean 211 and standard deviation 212 might only be sent at particular times with particular periodicity.

In another example, in block 10I, the OBU 121 can determine whether it is time to send a score in a flag message. If so (block 10I=YES), a flag message is sent in block 10J. If not (block 10I=NO), then the method proceeds to block 10K. In this example, no SJV or MJV threshold is used. Also, the highest score between the two metrics 275, 280 or both scores could be sent.

Figure 11:
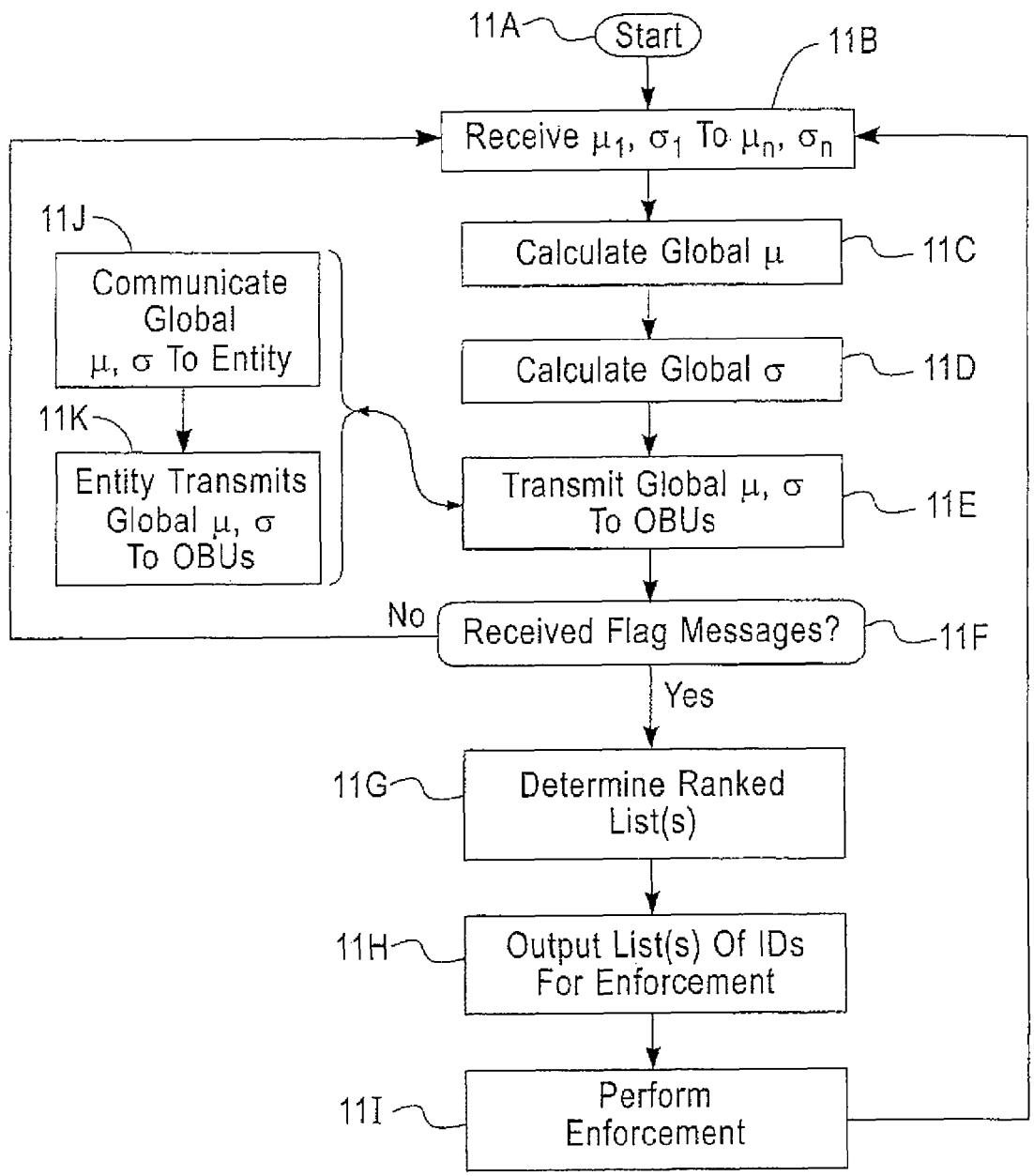
FIG. 11 is a block diagram of actions primarily performed by a back office processing apparatus in accordance with an exemplary embodiment of the invention.

Referring now to FIG. 11, a block diagram is shown of actions primarily performed by a back office processing apparatus 300 (or some other central server or other digital processing apparatus) in accordance with an exemplary embodiment of the invention. The method starts in block 11A, and in block 11B, the apparatus 300 receives the means 211-1 through 211-$n$ and receives the standard deviations 212-1 through 212-$n$ from the n OBUs 121. In block 11C, the apparatus 300 calculates a global mean 215, and in block 11D the apparatus 300 calculates a global standard deviation 216. In block 11E, the apparatus 300 communicates the global mean 215 and the global standard deviation 216 to the OBUs 121.

In block 11F, it is determined if the any flag messages 220 have been received. If a certain number of flag messages 220 have not been received (block 11F=NO), processing continues in block 11B. If a certain number of flag messages 220 have been received (block 11F=YES), then one or more ranked lists 368 are determined in block 11G. It should be noted that in block 11F, the messages may include scores from all vehicles or only those vehicles whose scores meet the thresholds described above. If the messages are from all vehicles, in block 11G, the apparatus 300 may create ranked list(s) having less than the number of vehicles. For example, the highest 100 scores may be output. Further, the scores may be mixed from each of the metrics 275, 280. In other words, one ranked list could include scores from metric 275 and one ranked list could include scores from metric 280, or a single ranked lists could include scores from both metrics 275, 280. In block 11H, the ranked lists 368 are output (or at least unique identifications are output) for enforcement. In block 11I, enforcement is performed. It is noted that block 11I will usually be performed by personnel at the back office 170. However, enforcement might be performed via, e.g., automatic generation of a fine and associated letter.

It should also be noted that the methods shown in FIG. 11 might be performed by different digital processing apparatus. For instance, blocks 11B, 11C, and 11D may be performed by a first computer system and blocks 11F, 11G, and 11H performed by a second computer system. In this example, block 11E is split into blocks 11J and 11K. In block 11J, the first computer system communicates the global mean 215 and global standard deviation 216 another entity (e.g., the second computer system in this example). The entity then transmits the global mean 215 and global standard deviation 216 to one or more of the OBUs.

Although primary emphasis herein has been placed on mean and standard deviation, other statistical measures such as median, mode, kurtosis may be used.

As should be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon executable, e.g., by a digital processing apparatus.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device, such as the digital processing apparatus shown, e.g., in FIGS. 2 and 3.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device such as the digital processing apparatus shown, e.g., in FIGS. 2 and 3.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or assembly language or similar programming languages. Such computer program code may also include code for field-programmable gate arrays, such as VHDL (Very-high-speed integrated circuit Hardware Description Language).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description has provided by way of exemplary and non-limiting examples a full and informative description of the best techniques presently contemplated by the inventors for carrying out embodiments of the invention. However, various modifications and adaptations may become apparent to those skilled in the relevant arts in view of the foregoing description, when read in conjunction with the accompanying drawings and the appended claims. All such and similar modifications of the teachings of this invention will still fall within the scope of this invention.

Furthermore, some of the features of exemplary embodiments of this invention could be used to advantage without the corresponding use of other features. As such, the foregoing description should be considered as merely illustrative of the principles of embodiments of the present invention, and not in limitation thereof.

What is claimed is:

1. A non-transitory computer-readable storage medium tangibly embodying a program of machine-readable instructions executable by a digital processing apparatus to cause the digital processing apparatus to perform operations comprising:

for each of a plurality of vehicles, receiving at least one representation of information corresponding to a vehicle, said information characterizing a plurality of differences in measured positions of the vehicle between ending points of journeys taken by the vehicle and starting points of consecutive, new journeys taken by the vehicle, said ending points and said starting points being determined by a measuring device aboard the vehicle, said ending points being the last known positions of the vehicle in the journeys and said starting points being the positions of the vehicle when the measuring device is enabled at the start of consecutive, new journeys, said differences in measured positions arising where said ending points of journeys and said starting points of consecutive, new journeys as measured by the measuring device aboard the vehicle do not coincide with one another, said plurality of differences in measured positions being quantified by a plurality of respective distance differences;

calculating from said at least one representation of said information at least one global representation of said information, said at least one global representation characterizing a plurality of distance differences for the plurality of vehicles;

transmitting said at least one global representation of said information for receipt by a digital processing on-board unit in at least one of said plurality of vehicles, enabling said digital processing on-board unit to calculate at least one metric for detecting fraud in the use of the measuring device using the at least one global representation when the vehicle makes a new journey by identifying any anomaly among the plurality of the distance differences for the vehicle; and receiving a flag message from said digital processing on-board unit when potential fraud is detected to trigger enforcement at a central location through the automatic generation of a fine and an associated letter to a possible abuser of said measuring device.

2. The non-transitory computer-readable storage medium of claim 1, wherein:

calculating at least one global representation of said information comprises calculating a first value corresponding to a global mean of data determined using said information and a second value corresponding to a global standard deviation determined using the data; and transmitting said at least one global representation of said information comprises transmitting at least one representation of the first and second values.

3. The non-transitory computer-readable storage medium of claim 1, wherein, when a number of flag messages have been received, said program further causes the digital processing apparatus to perform operations comprising:

determining one or more ranked lists; and outputting the ranked lists for enforcement.

4. The non-transitory computer-readable storage medium of claim 1, wherein said at least one representation of information corresponding to a vehicle comprises a mean and a standard deviation corresponding to the plurality of respective distance differences.

5. The non-transitory computer-readable storage medium of claim 1, wherein calculating said at least one metric determines at least one score; and wherein the flag message comprises at least one representation of the at least one score.

6. The non-transitory computer-readable storage medium of claim 5, wherein the flag message comprises at least one representation of the at least one score when the at least one score is greater than at least one preselected threshold.

7. The non-transitory computer-readable storage medium of claim 2, wherein one of the at least one metrics comprises the following: $\Phi_{(\mu,\sigma)}^{-1}(\max x_j)$, where $\Phi_{(\mu,\sigma)}^{-1}(\bullet)$ is an inverse normal cumulative distribution function using the received global mean, $\mu$, and the received global standard deviation, $\sigma$, max is a maximum function, and each $x_j$ is a distance difference for a journey j.

8. The non-transitory computer-readable storage medium of claim 7, wherein one of the at least one metrics comprises the following: $\Pi_{k=1}^{K}\Phi_{(\mu,\sigma)}^{-1}(P_k(X))$, where $\Pi_{k=1}^{K}(\bullet)$ is a product function, K is a total number of distance differences for the plurality of journeys, and X is a distance difference distribution for the plurality of journeys.

9. The non-transitory computer-readable storage medium of claim 2, wherein one of the at least one metrics comprises the following: $\Pi_{k=1}^{K}\Phi_{(\mu,\sigma)}^{-1}(P_k(X))$, where $\Pi_{k=1}^{K}(\bullet)$ is a product function, where K is a total number of distance differences for the plurality of journeys, where $\Phi_{(\mu,\sigma)}^{-1}(\bullet)$ is an inverse normal cumulative distribution function using the received global mean, $\mu$, and the received global standard deviation, $\sigma$, and X is a distance difference distribution for the plurality of journeys.

10. A digital processing apparatus comprising:
at least one memory comprising instructions; and
at least one processor operatively coupled to the at least one memory, the at least one processor configured by the instructions to cause the digital processing apparatus to perform operations comprising:
for each of a plurality of vehicles, receiving at least one representation of information corresponding to a vehicle, said information characterizing a plurality of differences in measured positions of the vehicle between ending points of journeys taken by the vehicle and starting points of consecutive, new journeys taken by the vehicle, said ending points and said starting points being determined by a measuring device aboard the vehicle, said ending points being the last known positions of the vehicle in the journeys and said starting points being the positions of the vehicle when the measuring device is enabled at the start of consecutive, new journeys, said differences in measured positions arising where said ending points of journeys and said starting points of consecutive, new journeys as measured by the measuring device aboard the vehicle do not coincide with one another, said plurality of differences in measured positions being quantified by a plurality of respective distance differences;
calculating from said at least one representation of said information at least one global representation of said information, said at least one global representation characterizing a plurality of distance differences for the plurality of vehicles;
transmitting said at least one global representation of said information for receipt by a digital processing on-board unit in at least one of said plurality of vehicles, enabling said digital processing on-board unit to calculate at least one metric for detecting fraud in the use of the measuring device using the at least one global representation when the vehicle makes a new journey by identifying any anomaly among the plurality of the distance differences for the vehicle; and
receiving a flag message from said digital processing on-board unit when potential fraud is detected to trigger enforcement at a central location through the automatic generation of a fine and an associated letter to a possible abuser of said measuring device.

11. The digital processing apparatus of claim 10, wherein:
calculating at least one global representation of said information comprises calculating a first value corresponding to a global mean of data determined using said information and a second value corresponding to a global standard deviation determined using the data; and
transmitting said at least one global representation of said information comprises transmitting at least one representation of the first and second values.

12. The digital processing apparatus of claim 10, wherein, when a number of flag messages have been received, said program further causes the digital processing apparatus to perform operations comprising:
determining one or more ranked lists; and
outputting the ranked lists for enforcement.

13. The digital processing apparatus of claim 10, wherein said at least one representation of information corresponding to a vehicle comprises a mean and a standard deviation corresponding to the plurality of respective distance differences.

14. The digital processing apparatus of claim 10, wherein calculating said at least one metric determines at least one score; and wherein the flag message comprises at least one representation of the at least one score.

15. The digital processing apparatus of claim 14, wherein the flag message comprises at least one representation of the at least one score when the at least one score is greater than at least one preselected threshold.

16. The digital processing apparatus of claim 11, wherein one of the at least one metrics comprises the following: $\Phi_{(\mu,\sigma)}^{-1}(\max x_j)$, where $\Phi_{(\mu,\sigma)}^{-1}(\bullet)$ is an inverse normal cumulative distribution function using the received global mean, $\mu$, and the received global standard deviation, $\sigma$, max is a maximum function, and each $x_j$ is a distance difference for a journey j.

17. The digital processing apparatus of claim 16, wherein one of the at least one metrics comprises the following: $\Pi_{k=1}^{K}\Phi_{(\mu,\sigma)}^{-1}(P_k(X))$, where $\Pi_{k=1}^{K}(\bullet)$ is a product function, K is a total number of distance differences for the plurality of journeys, and X is a distance difference distribution for the plurality of journeys.

18. The digital processing apparatus of claim 11, wherein one of the at least one metrics comprises the following: $\Pi_{k=1}^{K}\Phi_{(\mu,\sigma)}^{-1}(P_k(X))$, where $\Pi_{k=1}^{K}(\bullet)$ is a product function, where K is a total number of distance differences for the plurality of journeys, where $\Phi_{(\mu,\sigma)}^{-1}(\bullet)$ is an inverse normal cumulative distribution function using the received global mean, $\mu$, and the received global standard deviation, $\sigma$, and X is a distance difference distribution for the plurality of journeys.

* * * * *